Patented Aug. 22, 1939

2,170,426

UNITED STATES PATENT OFFICE 2,170,426

CONTROL APPARATUS

Estel C. Raney, Columbus, Ohio, assignor to Ranco Incorporated, Columbus, Ohio, a corporation of Ohio Application May 19, 1937, Serial No. 143,559

10 Claims. (Cl. 158—28)

The present invention relates to control systems and more particularly to electrical control systems and apparatus for controlling fuel burning devices.

One of the objects of the present invention is to provide a control system which includes an electrically operated safety mechanism which is energized upon the starting of the fuel burning device and which is operable for rendering the system inoperative in the event of failure of combustion, an ignition device and controller therefore being also provided, said controller being actuated by the safety mechanism while the latter is effective. A combustion control is utilized for preventing the safety mechanism from rendering the system inoperative when the fuel burning device is operating in a normal manner.

In carrying out the above object it is a further object of my invention to provide the safety mechanism with an electrically operated thermal means for actuating the same, said thermal means being energized upon the starting of the fuel burning device, and, subsequent to the establishment of combustion, being energized intermittently for maintaining the safety mechanism at a substantially constant temperature.

Another object is to provide a system of control in which a time delay mechanism operates an ignition switch and a safety switch in combination with a combustion responsive device which operates upon the establishment of combustion and only while combustion continues, to prevent the operation of the safety switch and which time delay mechanism, in the event of failure of electric current, will delay the restarting of the system until ignition is reestablished.

Another object of the invention is to provide the system with a combustion responsive control which effectively conditions a shunt circuit for the thermal means, the circuit being established by action of the thermal means for intermittently shunting the said means for maintaining the same at a substantially constant temperature during operating periods of the fuel burning device.

Another object of the invention is to provide an electrically heated thermally operated safety means with an ambient temperature compensator for maintaining the time of operation of the safety means substantially constant regardless of variations in the ambient temperature.

It is a still further object of the invention to provide a controller with an electrically heated thermal means which is capable of movement, due to a change in temperature thereof and to provide for limiting the movement thereof prior to the operation of a switch and which is capable of moving in another direction and when so moved in the latter direction actuates a temperature limiting device for maintaining the thermal means at a substantially constant temperature.

Other and further objects and advantages will be apparent from the following description, reference being had to the accompanying drawings wherein preferred forms of embodiment of the present invention are clearly shown.

Figure 1:
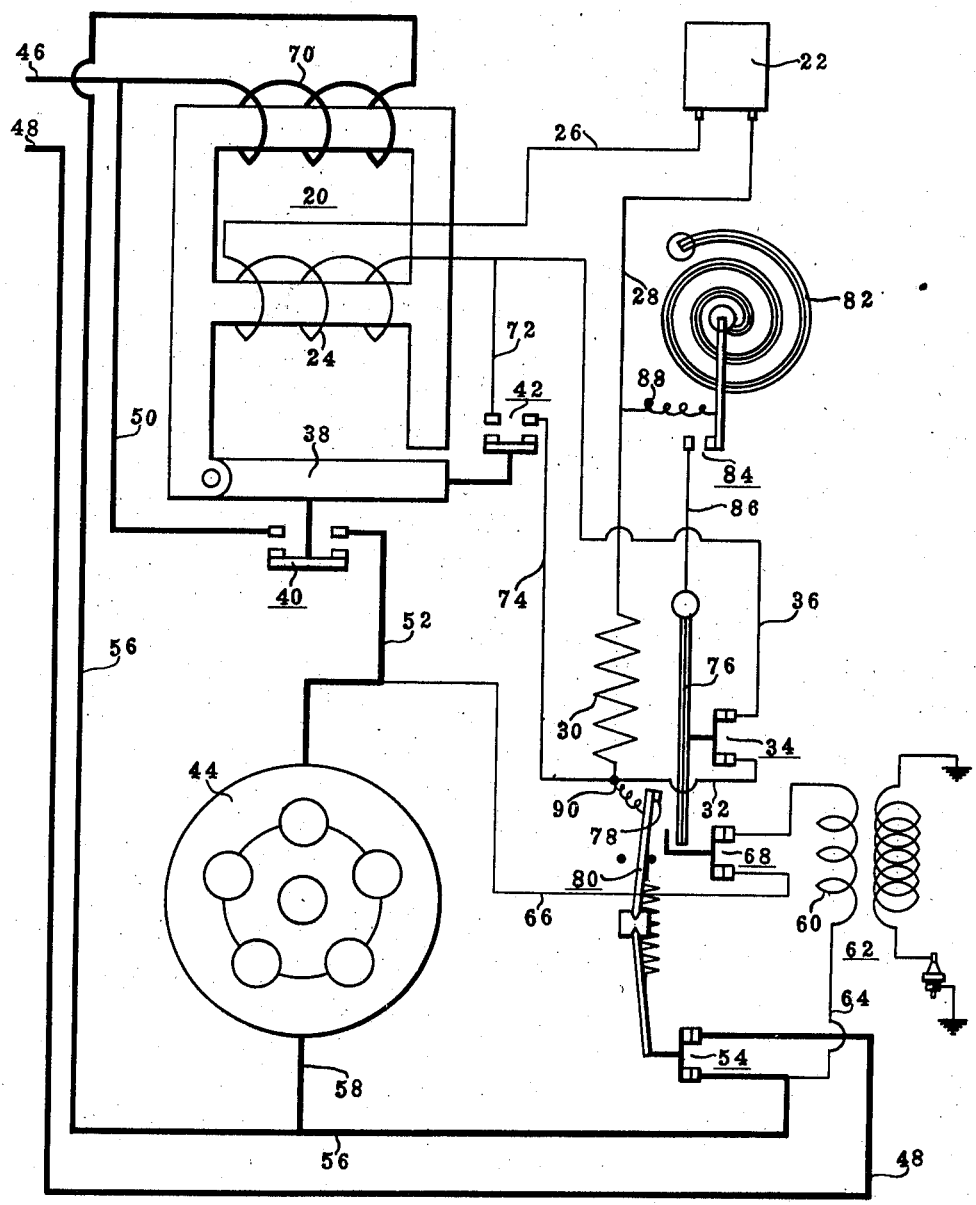
Fig. 1 is a schematic wiring diagram of one form of control system.

Referring to Fig. 1, one form of the present invention is shown wherein the system is utilized to control a fuel burning device, for example an oil burner. In the present embodiment a transformer relay 20 is used to perform the double function of supplying low voltage current for the secondary circuit of the system and of acting as a relay for actuating various control switches. A room thermostat 22 controls the normal operation of the system and is disposed in the secondary circuit, which circuit includes a secondary 24 of the transformer relay 20. When there is a demand for heat, room thermostat 22 closes to complete the circuit through secondary 24, wire 36, time delay switch 34, wire 32, heating coil 30, wire 28, thermostat 22 and wire 26. Completion of this secondary circuit causes the transformer relay 20 to draw armature 38 upwardly, which action closes the associated switches 40 and 42. Closure of switch 40 energizes a motor 44, which causes oil to be fed to the burner. The motor may control a pump, or blower, or it may be utilized to control the opening and closing of a valve in the fuel line. Closure of switch 40 causes current from one side of the line, namely wire 46, to traverse wire 50, switch 40, wire 52, to one side of the motor 44. The other side of the line, namely wire 48, is connected directly to a safety switch 54, which is connected by wires 56 and 58 to the other side of the motor.

A primary 60 of an ignition transformer 62 is connected in parallel across the motor 44 by wires 64 and 66 through an ignition switch 68. Thus the ignition transformer 62 is energized substantially simultaneously with the motor 44. It will be noted that a primary 70 of the transformer relay is connected across wires 46 and 48, through safety switch 54, and therefore, is energized continuously while the safety switch 54 is in the closed circuit position. Completion of the secondary circuit, also causes the armature 38 to close the switch 42, which is in a shunt secondary circuit. This circuit may be traced as follows: secondary 24, wire 72, switch 42, wire 74, heating coil 30, wire 28, thermostat 22, and wire 26 to the secondary 24. Thus upon closure of switch 42 the time delay switch 34 is shunted out of the secondary circuit.

When current flows through the secondary circuit the heating coil 30 is energized to heat a bimetallic strip, or thermostat 76, which is located in heat receiving relation to the coil 30. A predetermined period of heating causes the bimetal strip 76 to deflect toward the left to open the time delay switch 34. Further deflection of strip 76 causes the same to open the ignition switch 68 and to then engage a contact 78 disposed on one arm of a snap mechanism 80. If combustion has been established within the system, a stack control 82 causes closure of an associated switch 84, which completes a shunt circuit around the heating coil through pigtail 90, contact 78, bimetal 76, wire 86, switch 84, and pigtail 88. Thus when thermostat 76 engages contact 78, and combustion has been established, the heating coil 30 is shunted out of the circuit to substantially completely destroy the heating effect thereof. This allows the bimetallic strip 76 to cool and deflect to break its connection with contact 78, which again causes the heating coil 30 to be energized to re-heat the bimetallic strip 76 and cause a similar shunting action to occur. Thus the bimetallic strip 76 operates to make and break the shunt circuit to maintain itself at a substantially constant temperature during normal operating periods of the fuel burner.

In the event that combustion is not established in the system, the combustion controlled switch 84 is not closed, and therefore, the shunt circuit for the heating coil 30 is not rendered effective. Thus when thermostat 76 deflects toward the left it does not energize the shunt circuit but continues to deflect due to the continuous heating effect of coil 30 and causes snap mechanism 80 to be actuated to a position opposite from that shown in the drawings. Snap mechanism 80 is operatively associated with safety switch 54 and causes the same to be open circuited to deenergize the system. Before operation can be resumed within the system the safety switch 54 must be reclosed manually.

In case of power failure the armature 38 drops downwardly to open both the motor switch 40 and the shunt holding switch 42. In this case operation cannot be resumed until the bimetallic strip 76 has cooled sufficiently to close the time delay switch 34, to remake the starting circuit. It will be noted that time delay switch 34 is closed subsequent to the closure of the ignition switch 68, which sequence of closure assures that the ignition device will be operative before the system can be reenergized. The time delay switch 34, as operated by bimetallic strip 76, also provides for a purging period between successive energizations of the motor 44.

If combustion fails during an operating period of the system, combustion control 82 will cool to open switch 84 which will break the shunt circuit around the heating coil 30. Under these conditions bimetallic strip 76 deflects sufficiently to cause the safety switch 54 to be opened to deenergize the system.

Figure 2:
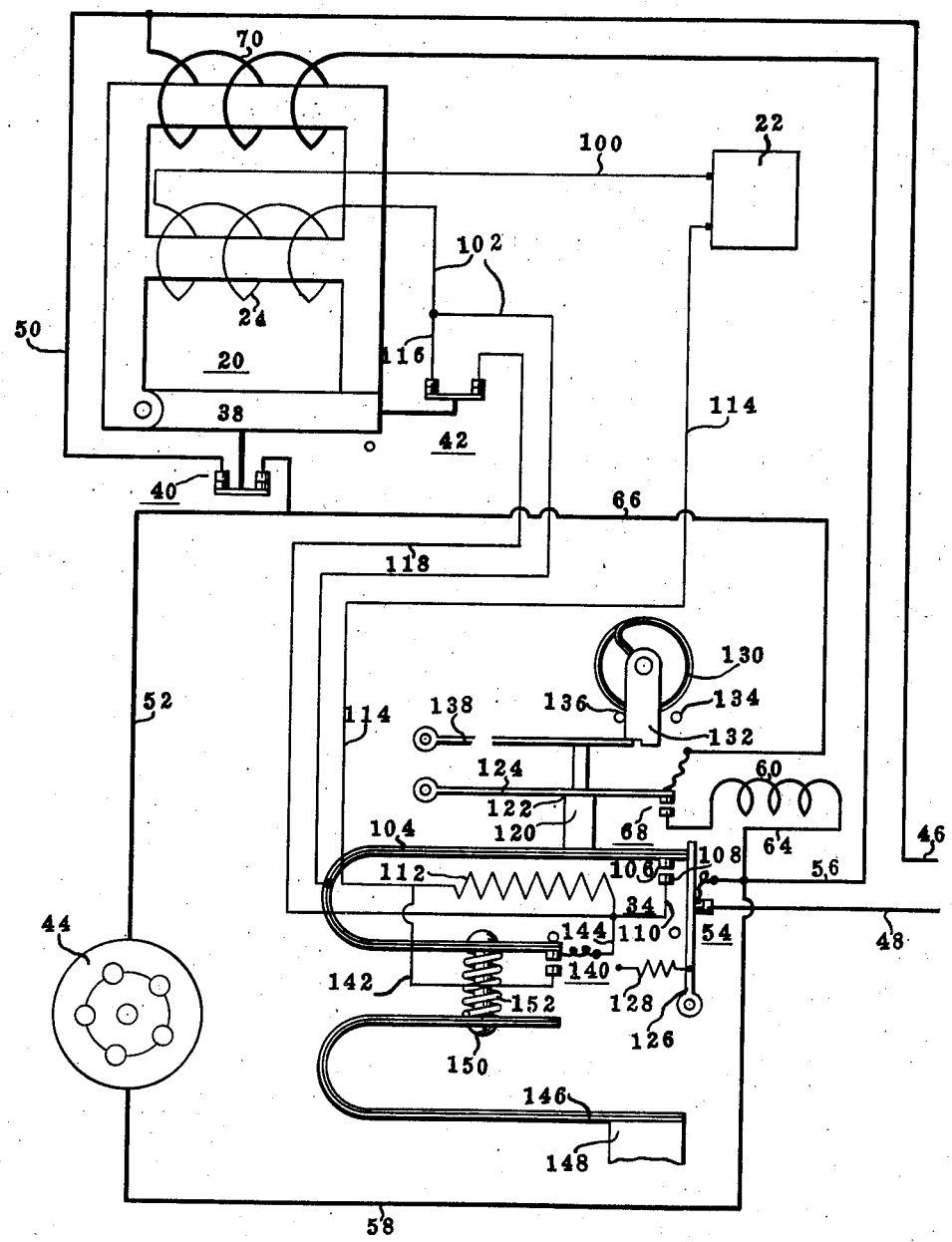
Fig. 2 is a schematic wiring diagram of another form of control system.

Fig. 2 shows another form of the invention wherein the timing device and safety mechanism are of a modified form. Upon a demand for heat, the thermostat 22 closes, to energize the secondary circuit, which includes, secondary 24, wire 102, bimetallic element 104, contacts 106 and 108 of the time delay device 34, wire 110, heating coil 112, wire 114, thermostat 22 and wire 100. Completion of the secondary causes the transformer relay 20, to draw its armature 38 upwardly to close the associated switches 40 and 42. Closure of switch 40 energizes the motor 44 and ignition primary 60, to start the system in operation. The motor, ignition and safety switch circuits in the present embodiment are similar to those already discussed in connection with Fig. 1.

Closure of switch 42, which is associated with the armature 38, causes a shunt circuit to be established around the time delay switch 34 which circuit includes secondary 24, wire 102, wire 116, switch 42, wire 118, heating coil 112, wire 114, thermostat 22, and wire 100 back to the secondary 24.

Completion of the secondary circuit causes a passage of current through heating coil 112 to cause the same to heat the adjacent U shaped bimetallic strip 104 which strip deflects upwardly to break the circuit through contacts 106 and 108 of the time delay switch 34, which switch 34 has previously been shunted out of the circuit by closure of the holding switch 42.

A shouldered pin 120 is carried on the upper blade of the U shaped bimetallic strip 104, and a shoulder 122 thereof engages a pivotly mounted lever 124, which is operatively associated with the ignition switch 68. It is apparent, after a predetermined period of heating, that the bimetal 104 will deflect sufficiently to cause the ignition switch 68 to be opened by the action of lever 124, which action occurs subsequent to the opening of the time delay switch 34.

The end of the upper blade of the U-shaped bimetal 104 is disposed to abut the upper end of a pivotly mounted lever 126, which lever is operatively associated with the safety switch 54. The lever 126 is biased by a spring 128 to cause the switch 54 to be opened. However, as long as the bimetal 104 abuts the upper end of the lever 126, the switch 54 is maintained closed. Upon continued heating of the bimetal the same will be deflected upwardly sufficiently to move the abutting end thereof out of engagement with the lever 126 to allow the switch 54 to open.

In order to prevent the opening of the safety switch 54, when the system is operating in a normal maner, a combustion control 130 is provided which actuates a latch lever 132 between stops 134 and 136. When the combustion chamber is cold, lever 132 is against the stop 134, but after ignition of the fuel, the control 130 causes lever 132 to be rotatably displaced until the lever 132 engages stop 136. In this position lever 132 acts as a latch to prevent further upward deflection of the bimetal 104, as caused by the heating coil 112. It will be noted that the upper end of the push rod 120 abuts a pivotly mounted lever 138, which lever is disposed to engage the latch lever 132. The combustion control acts more rapidly than does the bimetal 104 and therefore, the latch lever 132 is in position to limit the upward movement of bimetal 104 through its associated lever 138 and prevents the abutting end of bimetal 104 from releasing the safety switch lever 126. Thus during normal operation, the bimetal 104, upon energization of the heating coil 112, first separates contacts 106 and 108 of the time delay switch 34, then breaks the ignition circuit through switch 68, after a predetermined period of operation of the ignition device, and then is locked or latched, to prevent further upward deflection, by lever 132. Limiting the upward movement of bimetal 104, while maintaining the heating coil 102 effective causes the bimetal to deflect downwardly against spring 152 and compensating bimetal 146, which compensating device will be described in detail hereinafter, to close switch 140. This action establishes a shunt circuit around the heating coil through wires 142 and 144. Completion of the shunt circuit substantially completely destroys the heating effect of the coil 112, which causes bimetal 104 to be cooled and deflect in the opposite direction to open the switch 140, which again renders the heating coil 112 effective. Thus the bimetal 104 operates switch 140 intermittently to maintain the bimetal at a substantially constant temperature during normal operating periods of the system.

Obviously if combustion is not established, the latch lever 132 remains inoperative and bimetal 104 continues to deflect upwardly until safety switch 54 has been released to operate, and de-energize the system. It will be noted that the combustion responsive control 130 is operative to not only prevent the bimetal strip 104 from releasing the safety switch 54, but also to cause the bimetal 104 to intermittently operate the shunt heating switch 140.

In case of current failure, the armature 38 drops downwardly to open switches 40 and 42. In this position the system cannot be reenergized until bimetal 104 has cooled sufficiently to re-close the time delay switch 34 and thus reestablish the secondary circuit. It will be noted that ignition switch 68 is arranged so as to be closed prior to the closure of time delay switch 34, which assures that the ignition device is operative before the system can be reenergized after the power is again present.

When combustion fails during operation of the device, combustion control 130 moves lever 132 out of engagement with lever 138 which permits the bimetal 104 to again deflect upwardly to cause the safety switch 54 to be opened.

In the present embodiment an ambient temperature compensator, hereinbefore referred to, is shown in connection with bimetal 104. The compensator consists of a U-shaped bimetal 146 similar in shape to bimetal 104 and fixedly mounted at one end thereof, as at 148. The other end of bimetal 146 is resiliently connected to bimetal 104 by a double headed rivet 150, which passes loosely through both bimetals, and a spring 152 which is disposed around the rivet 150, and between the bimetals 104 and 146. Bimetal 146 is so formed as to deflect in the opposite direction, upon application of heat, to the deflection of bimetal 104. Thus when the room temperature is increased for example, bimetal 104 deflects upwardly while bimetal 146 deflects downwardly the same distance, which maintains the abutting end of bimetal 104 substantially in the same position with respect to the safety switch lever 126. It may be said that bimetal 146 translatably displaces bimetal 104 to compensate the action thereof, due to the variations in ambient temperature, for maintaining the operating time of any and all the switches substantially constant.

In the systems as shown in Figs. 1 and 2, it will be noted that the combustion control effectively conditions the shunt circuit for the heating coils 30 and 112, which circuit is intermittently rendered ineffective by the cooling of the bimetallic strip for maintaining the same at a substantially constant temperature during normal operating periods of the device.

This feature causes the bimetallic strip to operate the safety switch within a very short period of time after the combustion control is rendered ineffective due to combustion failure. Since the bimetallic strip is maintained at a temperature slightly below the temperature required to operate the safety switch it is apparent that as soon as the combustion control operates, due to failure of combustion, the heater is rendered continuously effective to cause operation of the safety switch whereby the injection of fuel into the combustion chamber ceases substantially the same time that the combustion failure occurs.

While the forms of embodiment of the present invention as herein disclosed constitutes preferred forms, it is to be understood that other forms might be adapted, all coming within the scope of the claims which follow.

I claim:

1. A control system for a fuel burning device comprising in combination, an electric circuit for controlling the fuel burning device; electrically operated means for controlling said circuit; a control circuit for the electrically operated means; a thermostat in said control circuit for controlling the operation of the electrically operated means; a safety switch operable for rendering the fuel burning device inoperative; a second thermostat for operating the safety switch after a predetermined period of heating; electric heating means in the control circuit for heating the last mentioned thermostat when the circuit is energized; a third thermostat responsive to the establishment of combustion for preventing operation of the safety switch by the second thermostat; and a second switch operated by the second thermostat, subsequent to the establishment of combustion for intermittently rendering the said heating means inoperative for maintaining the second mentioned thermostat at a substantially constant temperature during operating periods of the fuel burning device.

2. A control system for a fuel burning device comprising in combination, an electric circuit for controlling the fuel burning device; electrically operated means for controlling said circuit; a control circuit for the electrically operated means; a thermostat in said control circuit for controlling the operation of the electrically operated means; a time delay switch in said control circuit and capable of interrupting the same; a safety switch in the circuit of the fuel burning device and operable for rendering the fuel burning device inoperative; a second thermostat adapted to operate, first the time delay switch, and then the safety switch; heating means in the control circuit and in heat transfer relation to the second thermostat, for causing the second thermostat to operate the said switches; a third thermostat responsive to the establishment of combustion for preventing the operation of the safety switch by the second thermostat; a third switch operated by the second thermostat, subsequent to the establishment of combustion for intermittently shunting the heating means for maintaining the second thermostat at a substantially constant temperature during operating periods of the fuel feeding device; and a fourth switch adapted to be operated by the electrically operated means prior to the operation of the time delay switch by the second thermostat for establishing a holding circuit around the time delay switch.

3. A control system for a fuel burning device comprising in combination, an electric circuit controlling the fuel burning device; electrically operated means for controlling said circuit; a control circuit for the electrically operated means; a thermostat in said control circuit for controlling the operation of the electrically operated means; a time delay switch in said control circuit and capable of interrupting the same; ignition means for igniting the fuel; an ignition switch for controlling the operation of the ignition means; a safety switch in the circuit of the fuel burning device; a second thermostat adapted to operate, first the time delay switch, second the ignition switch, and third the safety switch; heating means in the control circuit and in heat transfer relation to the second thermostat for causing the second thermostat to operate the said switches; a third thermostat responsive to the establishment of combustion for causing the operation of the safety switch by the second thermostat; a fourth switch operated by the second thermostat, subsequent to the establishment of combustion for intermittently shunting the heating means for maintaining the second thermostat at a substantially constant temperature during operating periods of the fuel burning device; and a fifth switch adapted to be operated by the electrically operated means, prior to the operation of the time delay switch by the second thermostat, for establishing a holding circuit around the time delay switch.

4. A control system for a fuel burning device comprising in combination, electrically operated means for controlling the fuel burning device; a safety switch operable for rendering the fuel burning device inoperative; electrically heated thermal responsive means adapted to operate the said safety switch after a predetermined period of operation of the said thermal means; a second switch adapted to be operated intermittently for maintaining the thermal means at a substantially constant temperature during operating periods of the fuel feeding device; and means responsive to the establishment of combustion for preventing the operation of the safety switch by the thermal means and for causing the thermal means to operate the second switch.

5. A control system for a fuel burning device comprising in combination, electrically operated means for controlling the fuel burning device; a safety switch operable to render the device inoperative; electrically heated thermal responsive means movable in one direction due to the heating thereof to actuate the safety switch; means responsive to the establishment of combustion for limiting the movement of the thermal responsive means in said one direction for preventing the actuation of the safety switch, said thermal responsive means being movable in another direction when its movement in said first direction is limited; and means actuated by the movement of the thermal responsive means in said other direction for causing said thermal responsive means to be operated intermittently.

6. A controller for an energy translating device comprising in combination, a switch operable for rendering said device inoperative, electrically heated thermal responsive means capable of movement in two directions, said means being adapted to operate said switch when moving in one of said directions; means responsive to operation of the device for limiting the movement of said thermal means in said one direction prior to the operation of said switch, whereby said thermal means moves in said other direction; and means operated by the thermal means when the thermal means is moving in said other direction, for maintaining the thermal means at a substantially constant temperature.

7. A controller for an energy translating device comprising in combination, a first switch operable for rendering the device inoperative; an electrically heated thermostat adapted to operate the switch after a predetermined period of heating of the thermostat; a compensation thermostat; means for yieldingly associating said first and second thermostats so that the first thermostat is translatably carried by the second thermostat, and is translated with respect to ambient temperature changes for maintaining the time of operation of said switch substantially constant regardless of ambient temperature; means responsive to operation of the device to be controlled for limiting the movement of said first thermostat in one direction for causing said thermostat to move in the opposite direction against the yielding means; and means operated intermittently by said first thermostat when the same is moving in the said opposite direction for intermittently modifying the heating effect of said first thermostat for maintaining the same at a substantially constant temperature during normal operating periods of the device.

8. A control system for a fuel burning device comprising in combination, electrically operated means for controlling the fuel burning device; a safety switch operable for rendering the fuel burning device inoperative; electrically heated thermal responsive means for causing said switch to operate after a predetermined period; a time delay switch adapted to be operated by the said thermal means prior to the operation of the safety switch and capable of deenergizing the electrically operated means; a third switch operated by the electrically operated means for shunting the time delay switch; a starting circuit including therein said time delay switch and said electrically operated means; a holding circuit including therein the third switch and the electrically operated means; a fourth switch operated by the thermal means; and means operated in response to the establishment of combustion for causing said fourth switch to be operated intermittently by the thermal means for maintaining the thermal means at a substantially constant temperature for preventing the thermal means from operating said safety switch.

9. In a control system for a fuel burner apparatus, a switch for controlling the apparatus, thermal responsive means for actuating the switch at a predetermined temperature of the said means; electrical heating means for heating said thermal means; means for controlling said heating means in response to the temperature of said thermal means for maintaining the temperature of said thermal means slightly below the temperature at which the thermal responsive means actuates said switch; and means responsive to operation of the burner apparatus for controlling said control means.

10. In a control system for a fuel burner apparatus, a switch operable to deenergize the apparatus and a second switch operable for controlling the starting of the apparatus; thermal responsive means for operating the first mentioned switch at one temperature and for operating the said second switch at a second temperature; electrical heating means for heating the thermal means; means for controlling the said heating means in response to the temperature of the thermal means for maintaining the thermal means intermediate the two said temperatures; and means responsive to the operation of the burner apparatus for controlling said control means.

ESTEL C. RANEY.